US009197417B2

(12) United States Patent
Ghanaie-Sichanie et al.

(10) Patent No.: US 9,197,417 B2
(45) Date of Patent: Nov. 24, 2015

(54) HOSTED APPLICATION SANDBOX MODEL

(75) Inventors: Arash Ghanaie-Sichanie, Bothell, WA (US); Matthew S. Augustine, Seattle, WA (US); Dharma K. Shukla, Sammamish, WA (US); Hari Krishnan S, Hyderabad (IN); Matthew J. Burdick, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1157 days.

(21) Appl. No.: 12/429,954

(22) Filed: Apr. 24, 2009

(65) Prior Publication Data

US 2010/0274910 A1   Oct. 28, 2010

(51) Int. Cl.
 G06F 15/16 (2006.01)
 H04L 9/32 (2006.01)
 G06F 21/53 (2013.01)

(52) U.S. Cl.
 CPC .............. *H04L 9/3234* (2013.01); *G06F 21/53* (2013.01); *H04L 2209/80* (2013.01)

(58) Field of Classification Search
 CPC .... H04L 9/3234; H04L 2209/80; G06F 21/53
 USPC ................................... 709/226, 229; 713/167
 See application file for complete search history.

(56) References Cited

U.S. PATENT DOCUMENTS

| 6,055,637 | A | 4/2000 | Hudson et al. |
| 6,438,600 | B1 | 8/2002 | Greenfield et al. |
| 6,539,424 | B1 * | 3/2003 | Dutta ............................ 709/219 |
| 6,691,230 | B1 | 2/2004 | Bardon |
| 6,766,371 | B1 * | 7/2004 | Hipp et al. ..................... 709/225 |
| 6,836,888 | B1 | 12/2004 | Basu et al. |
| 7,444,678 | B2 | 10/2008 | Whitmer et al. |
| 7,478,434 | B1 | 1/2009 | Hinton et al. |
| 7,836,493 | B2 | 11/2010 | Xia et al. |
| 7,882,352 | B2 * | 2/2011 | Dive-Reclus et al. ........ 713/164 |
| 2002/0031230 | A1 | 3/2002 | Sweet |

(Continued)

OTHER PUBLICATIONS

Google; "Google App Engine Developer's Guide", Jan. 15, 2009; code.Google.com/appengine; various excerpts; pp. 1-145; retrieved from http://web.archive.org/web/20090227060429/http://code.google.com/appengine/downloads.html on Aug. 11, 2011.*

(Continued)

*Primary Examiner* — Oleg Survillo
(74) *Attorney, Agent, or Firm* — Bryan Webster; Kate Drakos; Micky Minhas

(57) ABSTRACT

An application host (such as a web application server) may execute a set of applications on behalf of a set of users. Such applications may not be fully trusted, and a two-way isolation of the distributed resources of an application (e.g., the executing application, the application user interface on the user's computer, and server- and client-side stored resources) from other applications may be desirable. This isolation may be promoted utilizing the cross-domain restriction policies of each user's computer by allocating a distinct subdomain of the application host for each application. The routing of network requests to a large number of distinct subdomains may be economized by mapping all distinct subdomains to the address of the domain of the application host. Moreover, the application user interfaces may be embedded in an isolation construct (e.g., an IFRAME HTML element) to promote two-way isolation among application user interfaces and client-side application resources.

20 Claims, 6 Drawing Sheets

(56) References Cited

U.S. PATENT DOCUMENTS

| | | |
|---|---|---|
| 2003/0172145 A1 | 9/2003 | Nguyen |
| 2004/0002976 A1 | 1/2004 | Lucovsky |
| 2004/0054793 A1 | 3/2004 | Coleman |
| 2005/0149726 A1* | 7/2005 | Joshi et al. .................... 713/164 |
| 2006/0089967 A1 | 4/2006 | Gutmans et al. |
| 2006/0126619 A1* | 6/2006 | Teisberg et al. ............... 370/389 |
| 2006/0155776 A1 | 7/2006 | Aust |
| 2006/0174334 A1* | 8/2006 | Perlin et al. ........................ 726/9 |
| 2006/0277305 A1* | 12/2006 | Bernardin et al. ............ 709/226 |
| 2007/0050854 A1 | 3/2007 | Cooperstein et al. |
| 2007/0294530 A1* | 12/2007 | Zlotnick ........................ 713/167 |
| 2008/0083031 A1 | 4/2008 | Meijer et al. |
| 2008/0313648 A1 | 12/2008 | Wang et al. |
| 2009/0210702 A1* | 8/2009 | Welingkar et al. ............ 713/156 |
| 2009/0271472 A1* | 10/2009 | Scheifler et al. ............... 709/202 |
| 2010/0173608 A1* | 7/2010 | Lundblade et al. ........... 455/410 |
| 2012/0041842 A1* | 2/2012 | Adelman et al. ........... 705/26.35 |

OTHER PUBLICATIONS

Hickson et al; "HTML 5"; Apr. 23, 2009; W3C Working Draft; www.w3.org; various excerpts; pp. 1-88; retrieved from http://www.w3.org/TR/2009/WD-html5-20090423 on Aug. 11, 2011.*

Moodle01; "Run multiple instances of Moodle without duplicating base code?", forum posts from Sep. 29, 2004 through Jan. 23, 2008; moodle.org; pp. 1-18; retrieved from http://moodle.org/mod/forum/discuss.php?d=13211 on Apr. 19, 2012.*

"Important Security Considerations for Shared Web Hosting", Aug. 1, 2008, http://www.articlesbase.com/web-hosting-articles/important-security-considerations-for-shared-web-hosting-505623.html.

Meier et al., "Chapter 20—Hosting Multiple Web Applications", Jun. 2003, pp. 1-11, http://msdn.microsoft.com/en-us/library/aa302436.aspx.

"We Provide Web Hosting for South Africa", 1997-2009, pp. 1-6, http://www.epnetwork.co.za/web-hosting-microsoft.asp.

"Windows Shared Web Hosting (ASP, ASP.net)", 1998-2009 Firstserv Limited., http://www.firstserv.com/hostingServices/sharedHosting/windows/.

Shiflett, Shris, "Security Corner: Shared Hosting", Mar. 23, 2004, pp. 1-26, http://shiflett.org/articles/shared-hosting.

"Web Sandbox Architecture: Pipeline", 2008 Microsoft Live Labs, pp. 1-6, http://websandbox.livelabs.com/documentation/arch_pipe.aspx.

Seltzer, Larry, "Google Sandboxing Tries to Make Browsing Safer", Dec. 16, 2008, pp. 1-3, http://www.eweek.com/c/a/Security/Google-Sandboxing-Tries-To-Make-Browsing-Safer/.

Tao, Han, "A XACML-based Access Control Model for Web Service", 2005, http://ieeexplore.ieee.org/stamp/stamp.jsp?arnumber=01544254.

U.S. Appl. No. 12/418,658, Shukla et al., Apr. 6, 2009.

Kramer "SELinux—Highly Secured Web Hosting for Python-based Web Applications" pp. 1-6, Retrieved on: Feb. 12, 2009, http://www.packtpub.com/article/selinus-secured-web-hosting-python-based-web-applications.

Notice of Allowance cited in related U.S. Appl. No. 12/418,658 Dated: Apr. 4, 2013 pp. 28.

"Java Security Architecture", Oracle. Jan. 22, 2009. pp. 1-3. http://docs.oracle.com/javase/1.4.2/docs/guide/security/spec/security-spec.doc1.html.

Non Final Office Action cited in related U.S. Appl. No. 12/418,658 Dated: Apr. 9, 2012, pp. 1-39.

Amendment cited in related U.S. Appl. No. 12/418,658 Dated: Jul. 9, 2012 pp. 1-22.

Final Office Action cited in related U.S. Appl. No. 12/418,658 Dated: Sep. 27, 2012 pp. 1-44.

Moodle01, "Run Multiple instances of Moodle without duplicating base code?". Forum posts from Sep. 29, 2004 through Jan. 23, 2008; Moodle.org; Retrieved from: http://moodle/org/mod/forum/discuss.php?d=13211 Retrieved Date: Apr. 19, 2012.

Google; "Google App Engine Developers Guide", Jan. 15, 2009; code.Google.com/appengine; Various excerpts; pp. 1-145; Retrieved from: http://web.archive.org/web/20090227060429/http://code.google.com/appengine/downloads.html Retrieved Date: Aug. 11, 2011.

Hickson, et al.; "HTML 5" Apr. 23, 2009; W3C Working Draft; www.w3.org; Various excerpts; pp. 1-88. Retrieved From: http://www.w3.org/TR/2009/WD-html5-20090423 Retrieved Date: Aug. 11, 2011.

* cited by examiner

HOSTED APPLICATION SANDBOX MODEL

BACKGROUND

In the field of computing, an application may be executed by an application host, such as a web application executed by a web application server and communicating with a user through web pages rendered in a web browser. The application host may offer several such applications, and may embed several applications in the same web page. Each application may be configured to access a particular set of resources on the application host, including application resources (e.g., application binaries and configuration information), application programming interfaces and libraries provided by the application host, and data objects generated by the user and accessible to the application host.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An application host may be configured to execute a variety of applications, including applications that are developed by third parties. Such third parties may be untrusted or even unknown, and the applications generated thereby may contain faulty or malicious operations that steal a user's data objects, corrupt the application host, and/or waste resources. Such applications may also be capable of interfering with other applications executing on the application host, or with applications executing on the user's computer. For example, if a web page embeds two applications that execute in a user's web browser, the first application might (through misconfiguration or malicious design) interfere with the execution of the second application by querying for and operating on document elements associated with the second application, by interacting with the cookies of the second application stored in the user's web browser, or by monitoring or altering the communication of the second application with the application host of the second application.

In order to reduce vulnerabilities of hosted applications, an application host may utilize a cross-domain restriction policy implemented on the client, such as a same-origin policy implemented by the web browser of the computer. Such restrictions restrict an application to accessing resources associated with the subdomain to which the application belongs. For example, an application may only access remote resources that are hosted within the particular subdomain, and a web application may only access elements within the web document that are associated with the particular subdomain.

An application host may utilize these client-side policies in order to promote the isolation of hosted applications, both at the server (such as receiving and processing requested operations and granting access to server-side resources) and at the client (such as restricting the interaction of the application with other applications hosted by the same application host and embedded in the same web page.) One such technique involves allocating a distinct subdomain for each hosted application, such as "app1.host.com" and "app2.host.com," so that the cross-domain restrictions may effectively isolate these applications while executing on the client. However, it may be difficult for the application host (such as routing hardware) to contend with a large number of subdomains, particularly where the application host offers dozens or hundreds of hosted applications. Therefore, the application host may also map all of the distinct subdomains to a single network address, so that the requests may be similarly routed to the application server even if identified by different subdomains. Additional techniques may also be utilized, such as rendering an embedded web application within an isolation construct (e.g., a HyperText Markup Language [HTML] IFRAME element) that promotes the application of cross-domain restrictions by the user's computer (such as the client-side web browser), and by implementing a permission token mechanism (such as a cryptographically signed cookie) that indicates the permissions that a user may have authorized for the application to access his or her data at the application host.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
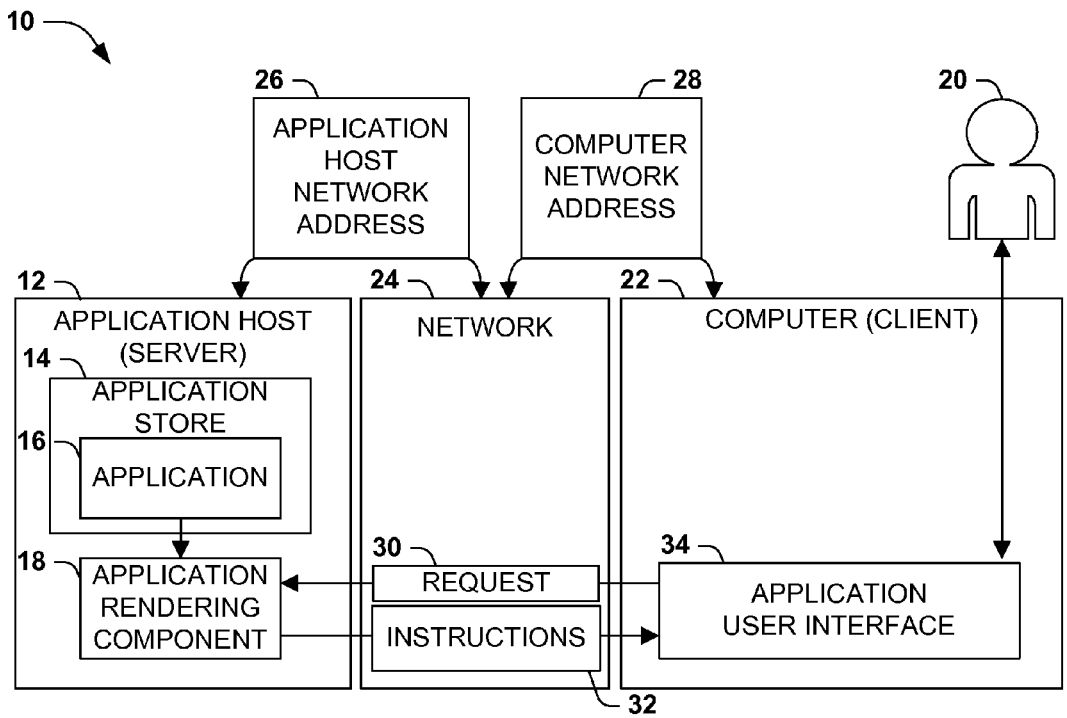
FIG. 1 is an illustration of an exemplary scenario of an application host configured to execute an application on behalf of a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, an application may be hosted by an application host to be executed on behalf of a user of a computer in a server-client arrangement. As one example, a web application may be provided by an application web server that generates one or more web pages that are delivered to the computer to be rendered and displayed for the user within a web browser. As another example, an application server may remotely execute an application and may send instructions to the computer to render a user interface for the user that accepts input and displays output. Each computer may have a network address, and communication therebetween may be arranged according to various protocols (which may comprise, e.g., one or more implementations of various layers of a network stack.) The execution of the application may be allocated in various ways over the computing resources of the application host and the user's computer, and possibly over those of other computers. For example, a thin-client architecture may allocate a large portion of the application processing to the application host and may allocate to the client only basic input and output functions. Alternatively, the application may involve some client-side processing, wherein I/O pre- or post-processing or portions of business-logic processing may be performed by the user's computer. The application host and the user's computer are often connected over a network, such as the internet or a local area network.

FIG. 1 illustrates a first exemplary scenario 10 involving an application host 12 configured to execute an application 16 on behalf of a user 20 of a computer 22, where the application host 12 and the computer 22 represent a server-client relationship. The application host 12 stores the application 16 in an application store 14, such as an executable (e.g., a script, a compiled library or assembly, or an application markup document formatted according to XAML) stored in a portion of the file system of the application host 12. The application host 12 may also be capable of communicating with the computer 22 over a network 24, such as the internet, a local area network (LAN), or a cellular network. Moreover, the application host 12 and the computer 22 may each have a network address 26, 28 that distinctively identifies (respectively) the application host 12 and the computer 22 for addressing and identifying messages exchanges over the network 24. The user 20 may send a request 30 to the application host 12 over the network 24 to execute the application 16, which may generate an instance of the application 16 and commence execution. The application 16 may communicate with the user 20 through a rendering of an application user interface 34 on the computer 22 that may be configured to receive input from the user 20 that may be forwarded to the application 16 executing on the application host 12 and/or to generate output to be rendered on the computer 22 for the user 20. The application 16 may generate the application user interface 34 on the computer 22 by sending instructions 32 over the network 24 for rendering the application user interface 34, such as an Extensible Application Markup Language (XAML) document that models the controls and layout of the application user interface 34 and indicates how input received from the user 20 may be handled. Moreover, the instructions 32 may also allocate a portion of the processing of the application 16 to the computer 22; e.g., it may be more efficient to perform some input pre-processing and/or output post-processing of the application 16 on the computer 22 rather than on the application host 12. The exemplary scenario 10 therefore models a typical hosting and execution of an application 16 by an application host 12 on behalf of a user 20 of a computer 22.

Figure 2:
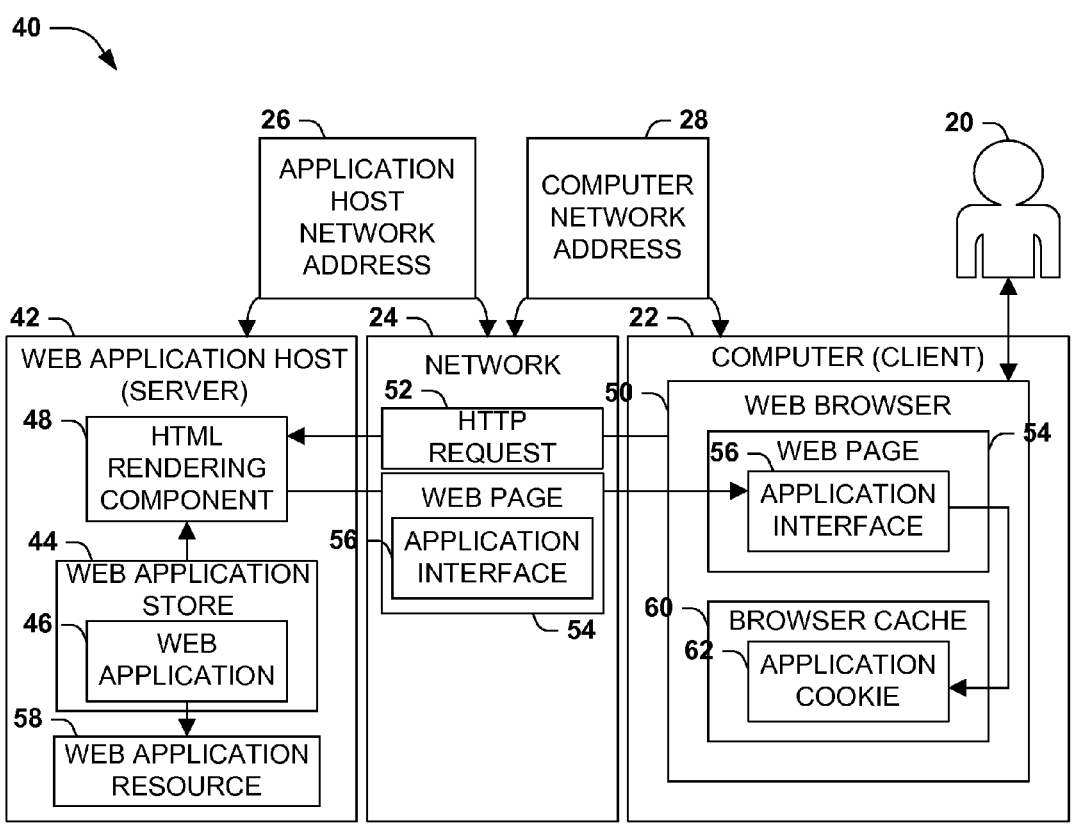
FIG. 2 is an illustration of an exemplary scenario of a web application server configured to execute a web application on behalf of a user, and to present a web application user interface to the user embedded in a web page presented by a web browser.

FIG. 2 illustrates a more specific and detailed example 40 that involves a web application 46 hosted by a web application server 42 and stored in a web application store 44. The web application 46 is configured to present the application user interface 56 within a web browser 50 executing on the computer 22 operated by the user 20. More specifically, the web application 46 is embedded in a web page 54, such as in a hypertext markup language (HTML) document sent to and rendered by the web browser 50 in response to a hypertext transfer protocol (HTTP) request 52 initiated by the user 20 (e.g., a request to visit a particular uniform resource locator [URL] associated with the web application 46.) The web application host 42 may therefore fulfill requests to execute the web application 46 by implementing an HTML rendering component 48 that, upon receiving the HTTP request 52, invokes the web application 46 to execute on the web application host 42, and embeds any HTML generated by the web application 46 representing an application user interface 56 in a web page 54 delivered to the web browser 50. The web browser 50 then renders the web page 54, including the web application interface 56, and may forward input received from the user 20 to the web application host 42 (and in particular to the web application 46) for further processing. The web browser 50 may also permit the web application 46 to perform other actions, such as interacting with a web application resource 58 (e.g., a programming library, database, web service, or privately hosted process executing on the web application host 42) and/or configuring the application user interface 56 to store one or more application cookies 62 in a browser cache 60 associated with the web browser 50 in order to persist data across requests and sessions of the web application 46 and/or the web browser 50.

In more complex scenarios, an application host 12 may host more than one application 16, such as an email application and a chat application. Moreover, these applications may be executed concurrently on the application host 12, and the application user interfaces 34 may be combined into a user interface that is presented to the user 20. For example, a web page 54 may embed both an email application and a chat application that may be presented to the user 20 in an application user interface 34, such as an HTML document embedding elements of each application 16. In addition, the application host 12 may concurrently and/or consecutively execute one or more applications 16 on behalf of multiple users, such as a set of web visitors that each wish to execute a particular application 16. Moreover, an application 16 may interact with a particular set of resources, such as a database hosted by the application host 12. In even more complex scenarios, respective applications 16 may interface with distinct sets of application resources, and perhaps even resources exclusive to one or more applications 16 and/or users 20. For example, an application 16 may interact with a particular application resource stored on the application host 12, included in the application user interface 34 (e.g., a control embedded in a web page 54), and/or stored on the computer 22 (e.g., an application cookie 62 specific to the application 16.) It may be desirable to restrict other users 20, computers, and applications 16 from accessing such application resources. For example, an application 16 may store on the application host 12 a private data set, such as an email mailbox; may present the private data to the user 20 through a protected control in the application user interface 34, such as an email interface; and may store on the computer 22 private data of the user 20 for the application 16, such as authentication credentials to login to the application 16. The security of this application 16 and the associated user data may be compromised if other users 20, other applications 16, or even other instances of the same application 16 (e.g., other instances of an email client operated by other users 20) are able to access the private data stored on the application host 12 or the computer 22 or eavesdrop on the protected control within the application user interface 34.

Figure 3:
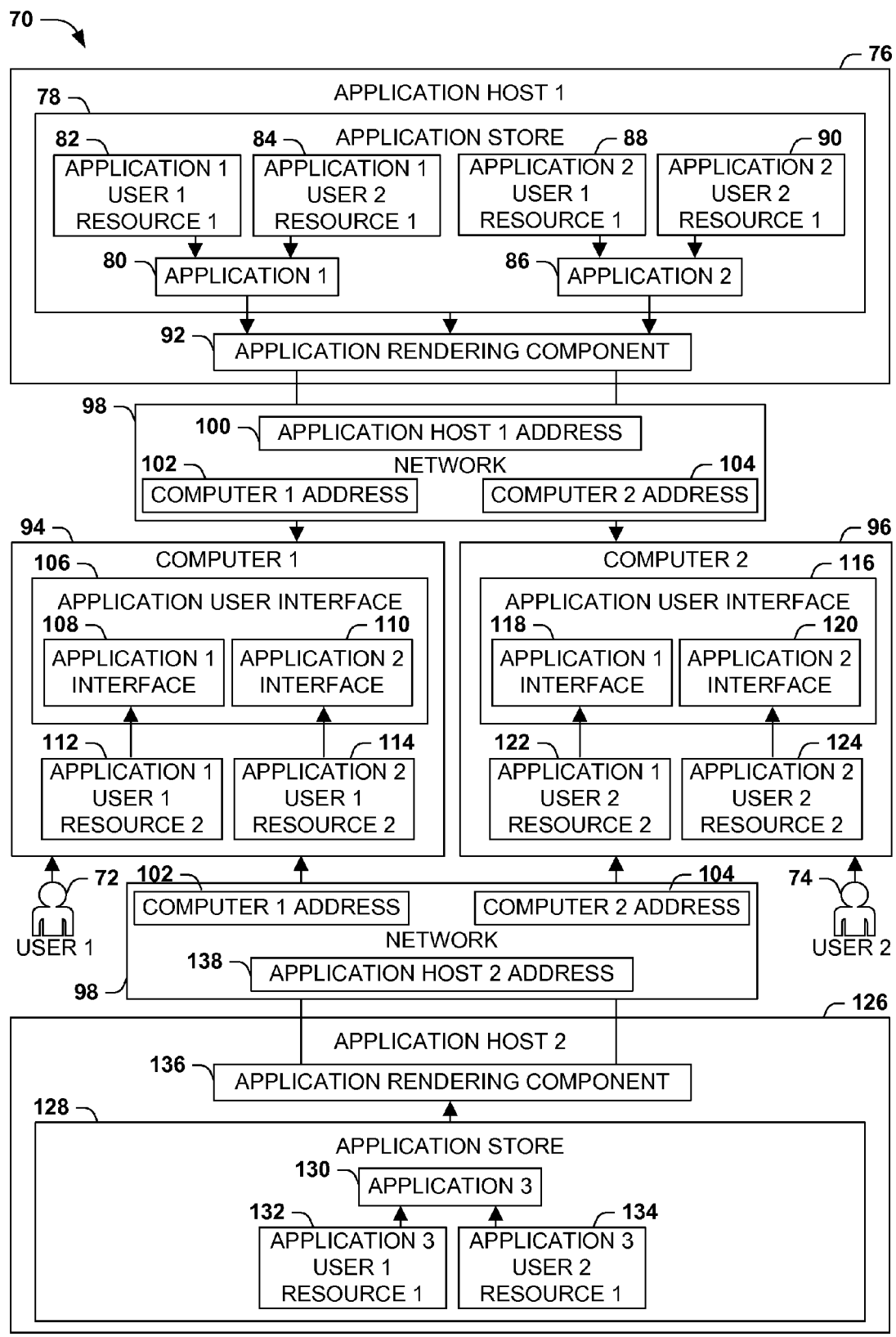
FIG. 3 is an illustration of an exemplary scenario of an application host configured to execute a set of applications on behalf of a set of users.

FIG. 3 illustrates an exemplary scenario 70 wherein a first user 72 and a second user 74 interact with a set of applications hosted on various application hosts. A first application host 76 may comprise an application store 78 (which may resemble, e.g., the application store 14 of FIG. 1, and may be similarly configured in various aspects) containing a first application 80 (which may be implemented, e.g., in a first application executable.) This first application 80 stores in the application store 78 of the first application host 76 a per-user set of resources, such as a first user resource 82 for the first user 72 and a second user resource 84 for the second user 74. The application store 78 of the first application host 76 also stores a second application 86, which also stores a first user resource 88 and a second user resource 90. The first application host 76 may present these applications to respective users in a user interface, such as a web page embedding a plurality of applications, which may be generated by an application rendering component 92. Moreover, the user interface may present these applications in various combinations, such as a set of interrelated applications that cooperatively provide a set of capabilities, a set of loosely interrelated applications that may interact in a simple manner, or as disassociated applications that are presented within the same user interface but that are visually and functionally isolated. The user interface may be transmitted to the computers operated by these users (such as a first computer 94 operated by the first user 72 and a second computer 96 operated by the second user 74) for rendering thereupon. These computers may communicate over a network 98, such as the internet, a local area network, or a cellular network, wherein the first application host 98 may have a first application host network address 100 (such as an IP address in an IP-based network), the first computer 94 may have a first computer network address 102, and the second computer 96 may have a second computer network address 104.

The computers of the users may be configured to present the applications executing on behalf of the users within respective application user interfaces. For example, the first computer 94 may present an application user interface 106 embodying both a first application user interface 108 of the first application 80 (which may render the data stored in the first user resource 82 of the first application 80) and a second application user interface 110 (which may render the data stored in the first user resource 88 of the second application 86.) Moreover, these application user interfaces may be configured to store various data objects on the computer 94 (e.g., as cookies stored in a browser cache of a web browser executing on the respective computers); such data objects may comprise, e.g., a first local user resource 112 generated by the first application 80 and a first local user resource 114 generated by the second application 86. Similarly, the second computer 96 may render and present to the second user 74 an application user interface 116 comprising a first application interface 118 corresponding to the first application 80 (which may render the second user resource 84 of the first application 80) and a second application interface 120 for the second application 86 (which may render the second user resource 90 of the second application 86); and, again, such application user interfaces may be configured to store local application resources on the second computer 96 a second local user resource 122 belonging to the first application 80, and a second local user resource 124 belonging to the second application 86.

Finally, the first user 72 and the second user 74 may also interact with a third application 130 hosted by a second application host 126. This third application 130 may be stored in an application store 128 of the second application host 126, along with a first user resource 132 and a second user resource 134 respectively associated with the first user 72 and the second user 74. Again, the application store 128 of the second application host 126 might resemble the application store 14 of FIG. 1, and may be similarly configured in various aspects. The second application host 126 may also render (e.g., by an application rendering component 136 of the second application host 126) a third application user interface for the third application 130 that may be included in the application user interface 106 of the first computer 94 and the application user interface 116 of the second computer 96, which may be transmitted to the first computer 94 and the second computer 96 over the network 98 (e.g., by sending the respective application user interfaces to the first computer network address 102 and the second computer network address 104 from a second application host network address 138.) Although not expressly illustrated in FIG. 3, it may be appreciated that the third application user interface of the third application 130 may be combined with the first application user interface 108 and the second application user interface 110 in respective application user interfaces. Additionally, although also not so illustrated in FIG. 3, the third application 130 may store local application resources for respective users on the first computer 94 and the second computer 96.

Figure 4:
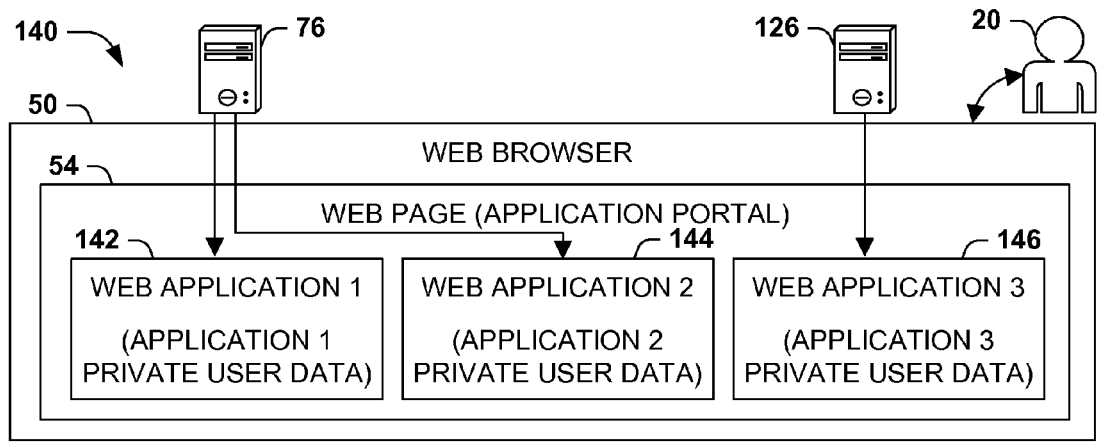
FIG. 4 is an illustration of an exemplary web page wherein several application user interfaces have been embedded.

In this manner, the computers of the respective users may assemble a composite application user interface, comprising application user interfaces for three distinct applications (two hosted on the first application host 76 and one hosted on the second application host 126.) Moreover, each application user interface may render private data for the respective users stored on the respective application hosts, and may be permitted to store data objects locally (such as cookies in the browser caches of the respective machines) in order to persist data over instances of the respective applications and the web browsers. FIG. 4 illustrates an exemplary scenario 140 of a web page 54 rendered in a web browser 50 on behalf of a user 20 and comprising a web application interface embedding a first application user interface 142 of a first web application, a second application user interface 144 of a second web application, and a third application user interface 146 of a third web application. Moreover, each application user interface may render private data of the user 20, which may be stored remotely (e.g., by the application host) or locally (e.g., as a cookie stored in the browser cache of the web browser 50, a file stored in a file system of the computer 22, a registry key stored in a system registry of the computer 22, or an application resource stored in an offline browser application cache implemented according to the HTML 5 standard), thereby presenting a personalized application experience. However, such web applications may be hosted by different application hosts; e.g., a first application host 76 may host the first web application and the second web application, and may transmit to the web browser 50 the first application user interface 142 and the second application user interface 144, while a second application host 126 may host the third web application and may present the third application user interface 146. Despite the various hosting sources of the applications, the transmitted application user interfaces may be combined in the web page 54 and rendered together by the web browser 50 to present an application user interface to the user 20. The application user interface may present the applications in visual and/or functional isolation (e.g., within separate visual containers and configured to function independently), or with degrees of interoperation (e.g., as related visual components of a single composite application, or functionally cooperating to achieve a desired result.)

However, in complex scenarios such as the exemplary scenario 70 of FIG. 3, a great number and variety of security risks may arise. As a first example, a first application 80 might permit a first user 72 to access the second user resource 84, comprising the private data of the second user 74 hosted on the first application host 76, thereby exposing the private data of the second user 74 to the first user 72. As a second example, the first application 80 may be permitted to access the first user resource 88 of the second application 86 stored on the first application host 76, and/or the first local user resource 114 of the second application 86 stored on the first computer 94, thereby interfering with the execution of the second application 86 and potentially leaking private data that the first user 72 expected to be restricted to the second application 86 into the first application 80. As a third example, the first application user interface 108 of the first application 80 executing within the application user interface 106 on the first computer 94 may be permitted to access the second application user interface 110 of the second application 86 (e.g., by accessing HTML document elements belonging to the second application 86 that are embedded in the composite web page), thereby permitting the first application 80 to monitor and/or interfere with the proper execution of the second application user interface 110 on the first computer 94. As a fourth example, the third application 130 executing on the second application host 126 may be permitted to access various resources of the first application host 76 (such as the user resources stored in the application store 78 of the first application host 76) and/or features of applications hosted by the first application host 76 but executing on the first computer 94 of the first user 72 (e.g., a third application user interface may be permitted to interact with the application user interfaces of the applications hosted by the first application host 76 or the locally stored user resources of such applications.) As a fifth example, an application user interface executing on the first computer 94 may be able to gain access to aspects of the second computer 96, e.g., by sharing the second computer network address 104 and allowing the user interfaces of an application executing on the respective computers to communicate and share the data of the second user 74 with the first user 72. It may be appreciated that many scenarios in the field of computing may be as complex or more complex as the exemplary scenario 70 of FIG. 3 (e.g., peer-to-peer distributed computing applications), and many types of vulnerabilities may be identified and exploited by malfunctioning or maliciously designed applications and computers.

Some of these vulnerabilities may be reduced by the implementation of cross-domain restriction policies, whereby an application (such as a web application) identifies a domain to which it belongs, and is restricted to accessing resources belonging to the same domain. A computer may, upon receiving or creating a resource on behalf of an application, associate such actions and data objects with the domain from whence the application was received. The application may thereafter be restricted to accessing resources associated with the same domain, and precluded from accessing resources associated with other domains. Cross-domain restriction policies are often implemented on computers in the context of executing untrusted applications. In particular, web browsers often implement a same origin policy that examines the domains associated with various web requests of executing applications and restricts applications to interacting with resources and servers within the same domain. The same origin policy is utilized by comparing the protocol, subdomain, and domain of a requested web resource with the protocol, subdomain, and domain of the requesting application in order to determine whether to permit or restrict the request.

For example, in FIG. 3, the first application 80 and the second application 86 are received from the first application host 76, which likely specifies a particular domain (e.g., "host1.com"), while the third application 130 is received from the second application host 126 that likely specifies a different particular domain (e.g., "host2.com"). For example, when the first application user interface 108 is received from the first application host 76 on behalf of the first application 80, the first application user interface 108 is associated with the domain of the first application host 76 (e.g., "host1.com"), and the resources of the first application 80, including the first user resource 82 and the first local user resource 112, are also associated with the same domain. When the first application user interface 108 attempts to access such resources, the first computer 94 may examine the associated domains and permit the operation. However, if the third application 130, which is associated with the domain of the second application host 126 (e.g., "host2.com") or an application user interface of the third application 130 attempts to access these resources of the first application 80, the first computer 94 may examine the associated domains, identify a mismatch, and restrict the accessing.

However, the configuration of the applications may vary the degree to which security issues may be reduced by cross-domain restriction policies. Again referring to FIG. 3, the first application host 76 may be configured to host various applications (including the first application 80 and the second application 86) at different addresses (such as URLs) within the same domain. For example, if the first application host 76 comprises the "host1.com" domain, the first application 80 may be located at a first location within the domain, such as "http://host1.com/app1", while the second application 86 may be located at a second location within the domain, such as "http://host1.com/app2". This configuration may reflect a logical arrangement of the applications on the first application host 76; e.g., the organization of the URLs may reflect the organization of corresponding files within the file system of the first application host 76 as a webserver, or to a first server (hosting the first application 80) and a second server (hosting the second application 86) in a distributed server configuration. Because these applications are hosted by the first application host 76, the resources of such applications (both stored on the first application host 76 and on various computers, such as the local user resources stored on first computer 94) are protected by cross-domain restriction policies from interference from applications hosted by other application hosts, such as the second application host 126. However, because the applications are hosted within the same domain ("host1.com"), and also within the same subdomain and accessible through the same protocol (in this example, HTTP), the applications may be able to interact with each other. For example, cross-domain restriction policies, such as the same origin policy implemented on web browsers, do not preclude the first application 80 executing on the first application host 76 from accessing the second application 86 hosted on the application host 76 or the application user resources of the second application 86 (such as the first user resource 88 of the second application 86.) Such policies also do not restrict the first application user interface 108 executing on the first computer 94 from interfering with the second application user interface 110, or accessing the first local user resource 114 of the second application 86 stored on the first computer 94.

Techniques may be developed to promote the isolation of an application 16 hosted by an application host 12 and interfacing with a user 20 through an application user interface 34 of a computer 22. Such techniques may be particularly useful, e.g., where an application host 12 is configured to host applications received from third parties, which may not be as fully trusted as applications developed by the administrators of the application host 12. For example, a website may serve as an application platform that allows users to install and utilize a set of web applications 46, potentially including web applications 46 received from third parties (either directly received by the web application host 42 and offered to users 20, or received from a user 20 who may wish to use the web application 46.) It may be desirable to configure the web application host 42 to isolate an application from accessing the resources of other applications, including on the web application host 42, within the web browser 50 (such as accessing HTML elements of other applications embedded in the same web page 54), and elsewhere within the computer 22 (such as cookies of other web applications 46 stored in the browser cache 60.) Moreover, it may be advantageous to utilize currently implemented security mechanisms of the various components of this distributed system (such as may be implemented the application host 12, the application store 14, the computer 22 of the user 20, the web browser 50, and the browser cache 60) instead of depending on new security mechanisms that may be partially, inconsistently, or less than ubiquitously implemented. In particular, it may be advantageous to base such techniques on cross-domain restriction policies that extend to several aspects of such applications 16 (e.g., the elements of an application within an HTML document, the process hosting the application 16 on the computer 22, client-side resources of the application 16 such as application cookies 62, the application hosts 12 that the application 16 is permitted to contact, and the resources of an application host 12 that the application 16 is permitted to utilize.) Security models based on this model may apply to the entire set of resources utilized by an application 16, and may permit the application 16 to access this broad set of resources associated with the domain while restricting access to unrelated resources, thereby providing pervasive, two-way isolation of the application 16.

One such technique relates to the association of domains with the set of applications 16 hosted by an application host 12. An application host 12 may expose applications 16 at various locations associated with the application host 12, but in a manner that takes advantage of the cross-domain restriction policies to promote the isolation of an application 16 from other applications 16 stored on the same application host 12 (as well as applications 16 stored on other application hosts 12 and locally executed on the computer 22.) Specifically, the application host 12 may be configured to allocate a subdomain of the domain of the application host 12 for an application 16. For example, with reference to FIG. 3, if the first application host 76 is associated with the "host1.com" domain, the first application 80 may be associated with the subdomain "app1.host1.com", and the second application 86 may be associated with the subdomain "app2.host1.com". If a subdomain is allocated for respective applications 16, then an application 16 (including all of its associated resources on the application host 12 and on the computer 22, such as the application user interface 34, elements of the application 16 embedded in a web page 54, and application resources stored on the computer 22, such as application cookies 62 stored in a browser cache 60) may be isolated from access by other applications 16, even those hosted on the same application host 12 but at a different subdomain, due to the cross-domain restriction policies implemented in various systems of the application host 12 and the computer 22. Moreover, distinct subdomains may be generated for different instances of the same application 16, such as a first instance executing on behalf of a first user 72 and a second instance executing on behalf of a second user 74.

However, this technique may raise difficulties with network management, because the number of subdomains associated with a particular domain of an application host 12 may grow to an unmanageable number and/or may change with an unmanageable frequency. For example, if an application host 12 hosts and executes one hundred applications 16 on behalf of one hundred users 20, and if each instance of an application 16 on behalf of each user 20 is allocated a distinct subdomain, the domain of the application host 12 may contain 10,000 subdomains. Routing hardware servicing the application host 12 may have considerable difficulty tracking the use of such subdomains; e.g., the routing tables used by such routing hardware may become significantly encumbered, thereby utilizing more computing resources and/or providing lower-quality service while contending with the vast number of subdomains. In view of this potential difficulty, this application isolation technique may also involve unifying the routing of the subdomains. For example, a single domain name server (DNS) entry may be created that maps all subdomains (e.g., "*.host1.com") to the network address 26 of the application host 26. This mapping may permit routing hardware to handle the wide variety of subdomain accesses to hosted applications 16 in an efficient manner. Moreover, new subdomains may be generated (e.g., a new subdomain for a new application 16, or for a new instance of an application 16) and may be properly routed without having to update the DNS entry mapping all subdomains to the same application host 12. Other advantages may also flow from this technique (e.g., if two applications 16 happen to utilize the same resource, e.g., "app1.host1.com/SharedResource" and "app2.host1.com/SharedResource"), the translation of both subdomains to the same network address (such as the IP address of host1.com) may permit the computer 22 to identify that a resource was previously accessed by another application 16, and to refer to a copy of the resource in a local cache.

Figure 5:
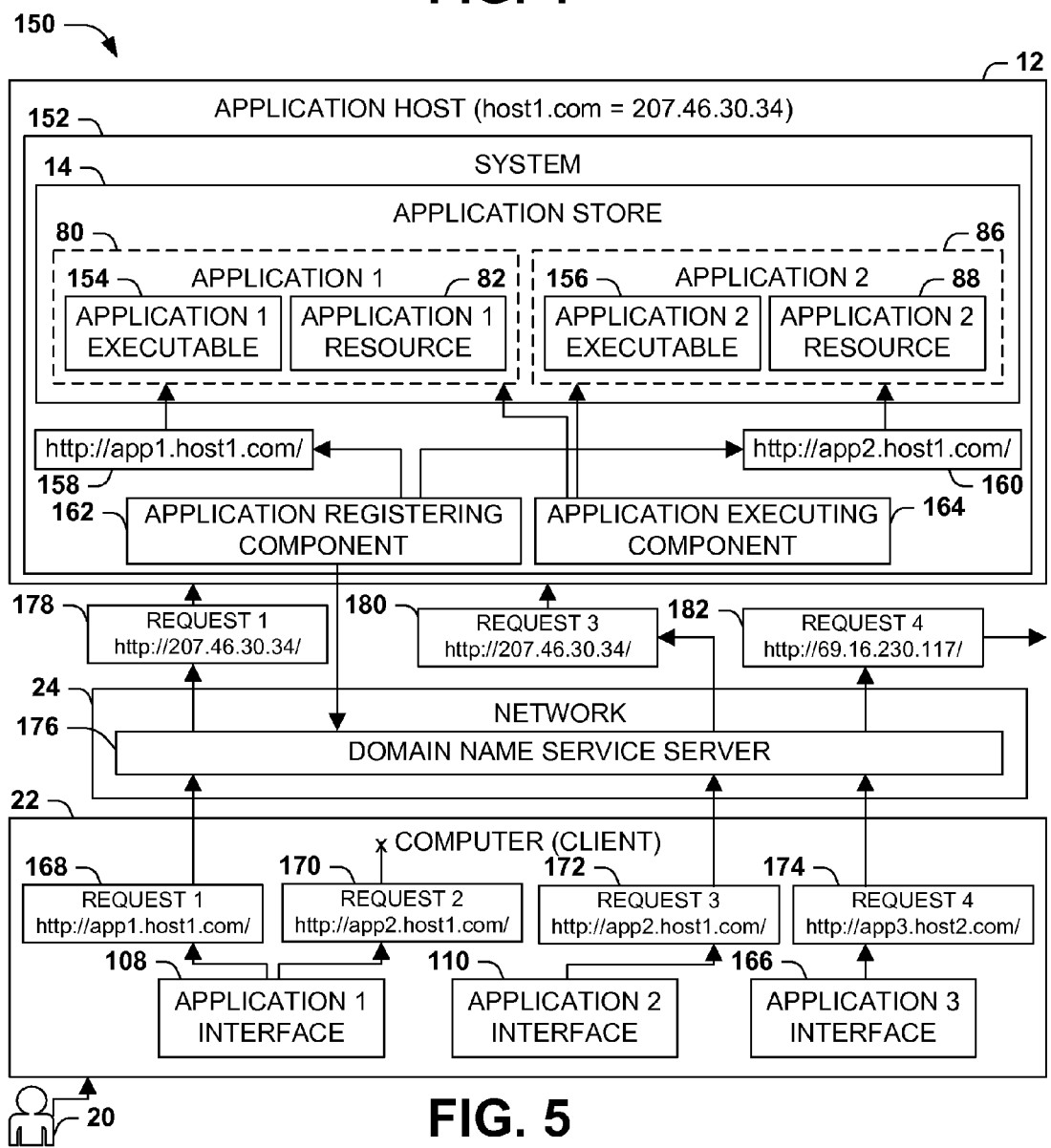
FIG. 5 is an illustration of an exemplary system configured to execute an application on an application host on behalf of a user of a computer.

FIG. 5 illustrates an exemplary scenario 150 applying this technique as an implementation of an application host 12 that is configured to execute one or more applications 16 on behalf of one or more users 20, each operating a computer 22 connected to the application host 12 over a network 24 and configured to present various application interfaces of the corresponding applications 16 that are executing on the application host 12. These application interfaces may issue requests to the application host 12 over the network 24, such as interfacing with the executing applications 20 and accessing remotely stored resources. In view of this scenario, the application host 12 may facilitate the registering and execution of applications in a manner that promotes the isolation of respective applications 20. The applications stored in the application store 14 may be assigned distinct subdomains, such as a first distinct subdomain 158 (e.g., "app1.host1.com") allocated for the first application 80 and a second distinct subdomain 160 (e.g., "app2.host1.com") allocated for the second application 86. Moreover, these subdomains may be mapped to the network address of the application host 12. Accordingly, in the exemplary scenario 150 of FIG. 5, the application host 12 incorporates an exemplary system 152 configured to execute various applications on behalf of users of computers. The exemplary system 152 of FIG. 5 includes an application store 14 that is configured to store applications 20, such as a first application 80 comprising a first application executable 154 (e.g., a script, a compiled library or assembly, or an application markup document formatted according to XAML) and a first application resource (e.g., a database, a media object, or a help document displayed within the application), and a second application 86 comprising a second application executable 156 and a second application resource. The exemplary system 14 also comprises an application registering component 162 that is configured to allocate a distinct subdomain of the exemplary system 14 for respective applications, where each such distinct subdomain is mapped to the network address of the exemplary system 14. Finally, the exemplary system 14 comprises an application executing component 164 that is configured to, upon receiving a request to execute an application on behalf of a user (such as the user 20 of the computer 22), execute the application 16 on the exemplary system 14, and to present to the user 20 an application user interface of the application served from the distinct subdomain.

In the exemplary scenario 150 of FIG. 5, the exemplary system 152 functions in the following manner. When an application 16 is registered with the application host 12, such as when the application resources of the first application 80 (including a first application executable 154 and a first application resource), the application registering component 162 allocates for the first application 80 a distinct subdomain of the domain of the application host 12. For example, if the application host 12 services the "host1.com" domain, the first application 80 may be allocated the "app1.host1.com" subdomain, and may be accessible at http://app1.host1.com. Moreover, the application registering component 162 maps this distinct subdomain to the same IP address as the domain of the application host 12, e.g., 207.46.30.34. Similarly, when the second application 86 is received and stored in the application store 14, the application registering component 162 allocates the "app2.host1.com" distinct subdomain for the second application 86, which is also mapped to the same IP address as the domain of the application host 12. In this exemplary scenario 150, a user 20 of a computer 22 may thereafter request to execute both applications, along with a third application hosted by a different application host, such as by directing a web browser executing on the computer 22 to access a web page embedding the application user interfaces of all three hosted applications. For example, when the user 20 invokes the first application 80, the computer 22 sends a request to the application host 12 over the network 24 to execute the first application 80. The application executing component 164 thereby generates an executing instance of the first application 80 and sends to the computer 22 over the network 24 a first application user interface 108. Similarly, upon receiving a request to execute the second application 86, the application executing component 164 may instantiate and begin executing an instance of the second application 86, and may deliver to the computer 22 a second application interface 110. A third application interface 166 may also be received from another application host, and may be presented to the user 20 alongside the application user interfaces of the first application 80 and the second application 86 (e.g., within a web page embedding all three application user interfaces.) Moreover, the application interfaces are associated with the distinct subdomains allocated by the application registering component 162; e.g., the first application user interface 108 is associated with the "app1.host1.com" distinct subdomain, while the second application interface 110 is associated with the "app2.host1.com" distinct subdomain.

Thereafter, the computer 22 may issue various requests to the respective applications 16 of respective application hosts 12 to perform certain operations; e.g., the user 20 may, through the first application user interface 108, request the first application 80 executing on the application host 12 to perform an operation, such as accessing a user resource stored on the application host 12. Accordingly, the computer 22 may generate and send to respective application hosts 12 various requests to be handled by the applications 16 executing thereupon. Due to the allocation of distinct subdomains by the application registering component 162, such requests may be handled in an expedient manner that promotes two-way isolation of the applications 16. For example, a first request 168 may be generated by the first application user interface 108 to be executed by the first application executable 154. Because the first request 168 is generated by the first application user interface 108, it is associated with the same subdomain as associated with the first application user interface 108, i.e., the "app1.host1.com" subdomain. The computer 22 thereby implements a cross-domain restriction policy check of the first request 168, and because the first request 168 is directed to an application 80 associated with the same distinct subdomain, the computer 22 permits the first request 168 to issue. The first request 168 is thereby delivered over the network 24, whereby the addressing of the first request 168 is translated by a domain name service (DNS). Due to the mapping of the distinct subdomain by the application registering component 162, the first request 168 is delivered to the same IP address as the application host 12, i.e., 207.46.30.34, and is accordingly routed to the first application host 12. Upon receiving the first request 168, the application host 12 may determine that the first request 168 was addressed to the "app1.host1.com" subdomain, and may deliver it to the first application 80 for execution. The first request 168 is therefore permitted by the cross-domain restriction policy of the computer 22. Moreover, this first request 168 may be efficiently routed to the application host 12 in the absence of a specific DNS entry corresponding to the distinct subdomain of the first application 80.

FIG. 5 also presents some contrasting processing of other requests that illustrate the isolation advantages of the exemplary system 14. As a first example, the first application user interface 108 may attempt to issue a second request 170 that is actually directed to the second application 86. However, the second request 170 is addressed to the distinct subdomain of the second application 86 at "app2.host1.com", which does not match the "app1.host1.com" distinct subdomain associated with the first application user interface 108. Therefore, the computer 22 prohibits the issuing of the second request 170 as a violation of the cross-domain restriction policy, thereby preventing the first application user interface 108 to violate the isolation of the second application 86. As a second example, the second application interface 110 may issue a third request 172 addressed to the second application 86, which passes the cross-domain restriction policy of the computer 22 and is delivered to the second application 86 over the network 24. Again, the domain name service server 176 may efficiently route the third request 172 to the application host 12, even in the absence of a specific DNS entry for the "app2.host1.com" distinct subdomain. As a third example, the third application interface 166 may issue a fourth request 174 to the third application executing on a different application host 12 (e.g., hosted at "app3.host2.com"). While this fourth request 174 may satisfy the cross-domain restriction policy of the computer 22, the fourth request 174 may be correctly routed by the network 24 away from the application host 12, thereby preventing any tampering with the first application 80 or the second application 86 by the third application interface 166. As a fourth example, the application interfaces executing on the computer 22 are prevented from interfering with each other; e.g., an application interface embedded in a web page may access neither the HTML elements of the other application interfaces nor locally stored user resources (such as browser cookies), which are associated with different subdomains. These examples illustrate some advantages of the exemplary system 152, including the accessibility of the collective resources of an application 16, the two-way isolation of an application 16 from other applications 16 across this model, and the efficiency of handling the routing of such requests (even in view of a large number of distinct subdomains) due to the DNS mapping performed by the application registering component 162.

Figure 6:
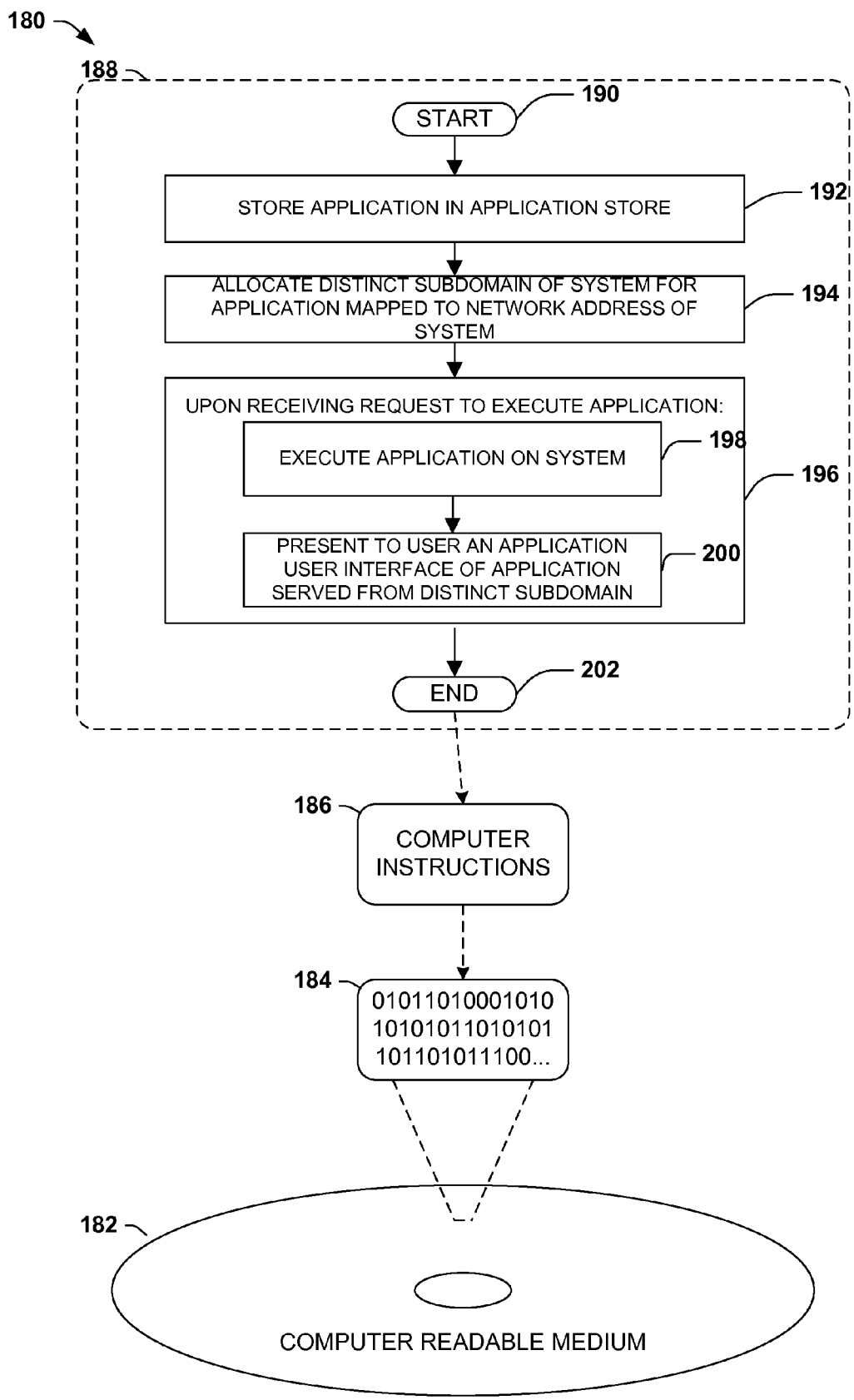
FIG. 6 is an illustration of an exemplary computer-readable medium comprising processor-executable instructions configured to embody one or more of the provisions set forth herein.

FIG. 6 illustrates another embodiment 180 of the techniques discussed herein, comprising a computer-readable medium comprising processor-executable instructions configured to implement an exemplary system such as described herein (such as the exemplary system 152 of FIG. 5.) The exemplary computer-readable medium illustrated in FIG. 6 comprises a computer-readable medium 182 (e.g., a CD-R, DVD-R, or a platter of a hard disk drive), on which is encoded computer-readable data 184. This computer-readable data 184 in turn comprises a set of computer instructions 186 that, when executed by at least one processor of a system, cause the at least one processor to execute an application on behalf of a user of a computer (e.g., with reference to FIG. 5, by causing an application host 12 to execute the first application 80 stored in the application store 14 on behalf of the user 20 of the computer 22.) In one such embodiment 180, the computer instructions 186 might cause the at least one processor to execute the application by storing 192 the application in the application store; by allocating 194 a distinct subdomain of the system for the application mapped to the network address of the system; and, upon receiving 196 a request to execute the application on behalf of the user, by executing 198 the application on the system and presenting 200 to the user an application user interface of the application served from the distinct subdomain. In another such embodiment (not shown), the processor-executable instructions 186 may be configured to implement a system configured to execute an application 16 on behalf of a user of a computer connected to the system over a network, which may include, e.g., an application store 14 configured to store the application 16; an application registering component 162 configured to allocate a distinct subdomain 158 of the system for the application 16 that is mapped to the network address of the system; and an application executing component 164 that is configured to execute the application 16 on the system, and to present to the user an application user interface of the application 16 served from the distinct subdomain 158. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 152 of FIG. 5) to confer individual and/or synergistic advantages upon such embodiments.

A first aspect that may vary among embodiments of these techniques relates to the configuration of the components of an exemplary system (such as the exemplary system 152 of FIG. 5) that implement the techniques presented herein. As a first example of this first aspect, the application store 14 may be configured in many ways to store the application. In a first such embodiment, the application store 14 comprises a portion of a filesystem of the application host 12, such as an assembly cache that is configured to store application executables (such as scripts, binaries, and application configuration information) and application resources (such as media objects, documentation, and data sources consumed by the application.) In a second such embodiment, the application store 14 comprises a portion of volatile or non-volatile system memory configured to store applications 16 that are currently executing on the application host 12, that are available for execution on the application host 12, and/or that have recently been executed on the application host 12.

As a second example of this first aspect, the application registering component 162 may be configured in many ways to allocate distinct subdomains for respective applications 16 that are mapped to the network address of an application server 12. In a first such embodiment, the application registering component 162 may fulfill the application of subdomains mapped to the application host 12 by communicating with a domain name service (DNS) provided by a domain name service server disposed on the network over which requests to access such applications 16 might be received. Upon receiving a request to make a new application 16 available on the application host 12, the application registering component 162 may send a request to the DNS server to create an entry in the DNS routing table that maps the subdomain to the network address of the application host 12. Subsequent requests to access the application 16 may then be handled by the domain name service server according to routing services. In one particular embodiment, the application registering component 162 might configure the domain name service server to route all subdomains matching a particular pattern (e.g., "app*.host.com") to the application host 12. This technique might be advantageous by reducing the per-application registration of subdomains by the application registering component 162 and by reducing the complexity of the routing rules of the domain name service server 176, thereby economizing the computing resources thereof. However, this technique might disadvantageously permit the routing of invalid requests to the application host 12, e.g., requests specifying subdomains that do not correspond to available applications 16.

In a second embodiment of this second example, the application registering component 162 may operate according to network address translation (NAT) principles for translating requests received over a network accessible to the application host 12. For example, the application registering component 162 may maintain an internal list of distinct subdomains allocated for applications 16 that are available on the application host 12. When the application host 12 receives a request to make a new application 16 available, this application registering component 162 may allocate to the application 16 a distinctive domain and may create a new entry in the list for the application 16. When the application registering component 162 later receives a request over the network referencing a subdomain that might correspond to an application 16, the application registering component 162 may attempt to locate the subdomain within the internal list. If the subdomain is located, the application registering component 162 might return a network address (e.g., the IP address) of the application host 12 hosting the application 16; but if the subdomain is not located in the internal list, the application registering component 162 might refuse the request (e.g., by returning an HTTP 404 error message.) In this manner, the application registering component 162 may satisfy the allocation of domains according to network address translation techniques. While this embodiment may more correctly route requests for particular applications 16 and may reject requests for unallocated subdomains, this approach might impose a greater computational burden on the domain name service server 176, such as by expanding the number of routing rules in the routing table utilized by the domain name service server 176.

As a third example of this first aspect, the application executing component 164 may comprise many components on the application host 12 that execute the application 16 on behalf of the user 20 and/or the computer 22 of the user 20. In a first such embodiment, the application executing component 164 may comprise a runtime on the application host 12 that is configured to load and execute one or more executables that specify the logic of the application. In a second such embodiment, the application executing component 164 may comprise a script interpreter that executes server-side scripts comprising the application 16, e.g., a JavaScript parser or Perl interpreter. In a third such embodiment, the application executing component 164 may comprise a virtual machine configured to execute the application 16, such as a Java virtual machine within which a Java-based application 16 may be executed in a safe manner. Those of ordinary skill in the art may devise many configurations of the components of systems that implement the techniques discussed herein.

A second aspect that may vary among embodiments of these techniques relates to additional security and access techniques that may supplement the exemplary system 152 of FIG. 5. While the exemplary system 152 promotes the isolation of an application 16 from other applications 16, this isolation may be further promoted with additional configuration of an implementation of these techniques. As a first example, additional measures may be taken to promote the isolation of an application user interface 34 from tampering by other applications. In one such scenario, an application user interface 34 of an application 16 may be embedded in a web page 54, such as a series of references specified in various elements of the document object model of the web page 54. Other applications embedded in the same web page 54 or executing concurrently within the web browser 50 may attempt to interact with the elements of the web page 54 comprising the application user interface 34 of the application 16 (e.g., detecting the state of controls, detecting or modifying the contents of variables, or interfering with the contents or execution of scripts.) In order to promote the isolation of the application 16, the application executing component 164 may be configured to present the element of the application user interface 34 within an isolation construct that is configured to isolate such elements from other applications 16. As one such example, the elements of a web application may be specified within an IFRAME HTML element that is associated with the distinct subdomain that has been allocated for the application 16 by the application registering component 162. The IFRAME HTML element may therefore be treated by the web browser 50 rendering the web page 54 in accordance with a cross-domain restriction policy (such as the same origin policy) that limits access to such elements to the application 16 associated with the distinct subdomain. Other scenarios may feature similar isolation constructs provided in accordance with other programming languages, platforms, and computing technologies (e.g., a protected memory section that is accessible only to a particular process, or similar element isolation mechanisms that may be available in other application user interface models, such as XAML.)

As a second example of this second aspect, the application registering component 162 may apply other criteria in the allocation of distinct subdomains for applications 16. In the exemplary scenario 150 of FIG. 5, it may be appreciated that while the allocation of distinct subdomains on a per-application basis may promote two-way isolation of the first application 80 from the second application 86, it might not promote an isolation among instances of a particular application 16. As a first example, a user 20 may wish to execute multiple instances of the application 16 (either concurrently or consecutively), and it may be advantageous to isolate a particular instance of the application 16 from other instances of the same application 16. As a second example, it may be desirable to implement two-way isolation of a first instance of an application 80 executed by a first user from a second instance of the application 80 executed on the same computer by a second user. This may be relevant, e.g., where two users of the same computer system concurrently access the application 16, thereby leading to two executing processes on the computer 22 that may be able to interact, potentially creating a security issue. Accordingly, the application registering component 162 may be configured to allocate a first distinct subdomain of the application host 12 for a first instance of the application 16, and a second distinct subdomain of the application host 12 for a second instance of the application 16. Distinct subdomains may be allocated in many ways, such as per user of the application (e.g., user1.app1.host1.com), per computer on which the application user interface is presented (e.g., computer1.app1.host1.com), and/or per instance of the application executed by any user (e.g., instance1.app1.host1.com). Moreover, the application executing component 164 may be configured to associate the first instance of the application 16 with the first distinct subdomain, and to associate the second instance of the application 16 with the second distinct subdomain, etc. This variation may promote the two-way isolation of various instances of the application 16.

As a third example of this second aspect, an application executing component 164 may be configured to, upon receiving a request to execute an application 16, perform some authentication before executing the application 16. In one such variation, the application host 12 may endeavor to authenticate the identity of the user 20 on whose behalf the application 16 is executed, such as according to at least one user authentication credential received from the user 20 (e.g., a username, password, shared secret, cryptographic authentication, biometric measurement, etc.) In one such set of embodiments, the computer 22 of the user 20 may be configured to store an authentication token that has been issued by an authenticating service upon authenticating the identity of the user 20. In one such embodiment, the application host 12 might fulfill this role by soliciting user authentication credentials from the user 20, e.g., by presenting to the user 20 a user login interface configured to receive from the user 20 at least one user login credential (such as a username and password.) Upon verifying the user authentication credentials, the application host 12 might generate at least one user authentication credential and send it to the computer 22, such as an authentication token issued by the application host 12 to verify the identity of the user 20. This authentication token might then be provided by the computer 22 with each request submitted to the application host 12, such as executing the application 16. The application host 12 may then verify the user authentication token before executing the application 16. In a second variation, the application host 12 may endeavor to authenticate the application 16 according to at least one application authentication credential received from the application 16. As a first example, the application host 12 may be able to access a binary hashcode provided by the application developer that verifies the identity of the application 16 and confirms that its contents have not been modified. As a second example, the application host 12 may authenticate an application user interface 34 executing on the computer 22 before fulfilling requests received therefrom, e.g., according to a shared-secret system or challenge/response asymmetric key system, whereby only the application user interface 34 having access to the shared secret or private key may be able to provide a correct response that authenticates the application 16. Those of ordinary skill in the art may devise many techniques for promoting the authentication of the user 20, computer 22, application 16, etc., and the addition of other isolation and security features, while implementing the techniques discussed herein.

A third aspect that may vary among embodiments of these techniques relates to the interaction of the application 16 with a computing environment of the user 20. While some primitive applications 16 (such as some web applications 46) may execute in complete isolation of the computing environment of the user 20, other applications 16 may desirably interact with some aspects of the computing environment. As a first example, a user 20 may wish to author a document with an office productivity application, and may wish to save the document in the local filesystem of the computer for access by other applications; accordingly, the application 16 may be permitted to access the local filesystem to store the data object. As a second example, an application 16 may interact with various components of the computer, such as devices (e.g., a media application accessing a portable media device), hardware components (e.g., a high-quality graphics application accessing a display adapter), software APIs (e.g., an enterprise application interacting with distributed resources), locally represented user accounts, application and operating system configuration information, etc.

Moreover, the nature of the computing environment may differ significantly among embodiments of these techniques. As one such example, the computing environment may exist only on the computer, which may also operate as the computing environment host. Alternatively, the computing environment may be distributed across several computers and devices in an uncoordinated or peer-to-peer manner; e.g., the application may execute within a virtual environment on a first computer, but may access a portion of the computing environment stored on another computer. As another alternative, the computing environment may represent a deployable computing environment that is deployed to a set of computers and devices and centrally managed by a computing environment host. In order to reduce the complex variety and decentralization of the data objects comprising a contemporary computing environment, a deployable representation of the computing environment may be devised, where the data objects comprising the computing environment are organized in a data object hierarchy, which may be hosted by a computing environment host. If the data objects are represented in a uniform manner and managed in a consistent way by a data object system, a set of services may be devised to apply to all data objects of the computing environment. The data object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) It may also be advantageous to configure at least one server to manage one or more data objects within the representation, and to accept operations sets (e.g., sets of Create, Read, Update, and Delete operations) to be applied to such data objects. A user of the deployable computing environment may therefore interact with the deployable computing environment in a platform- and device-independent manner.

Figure 7:
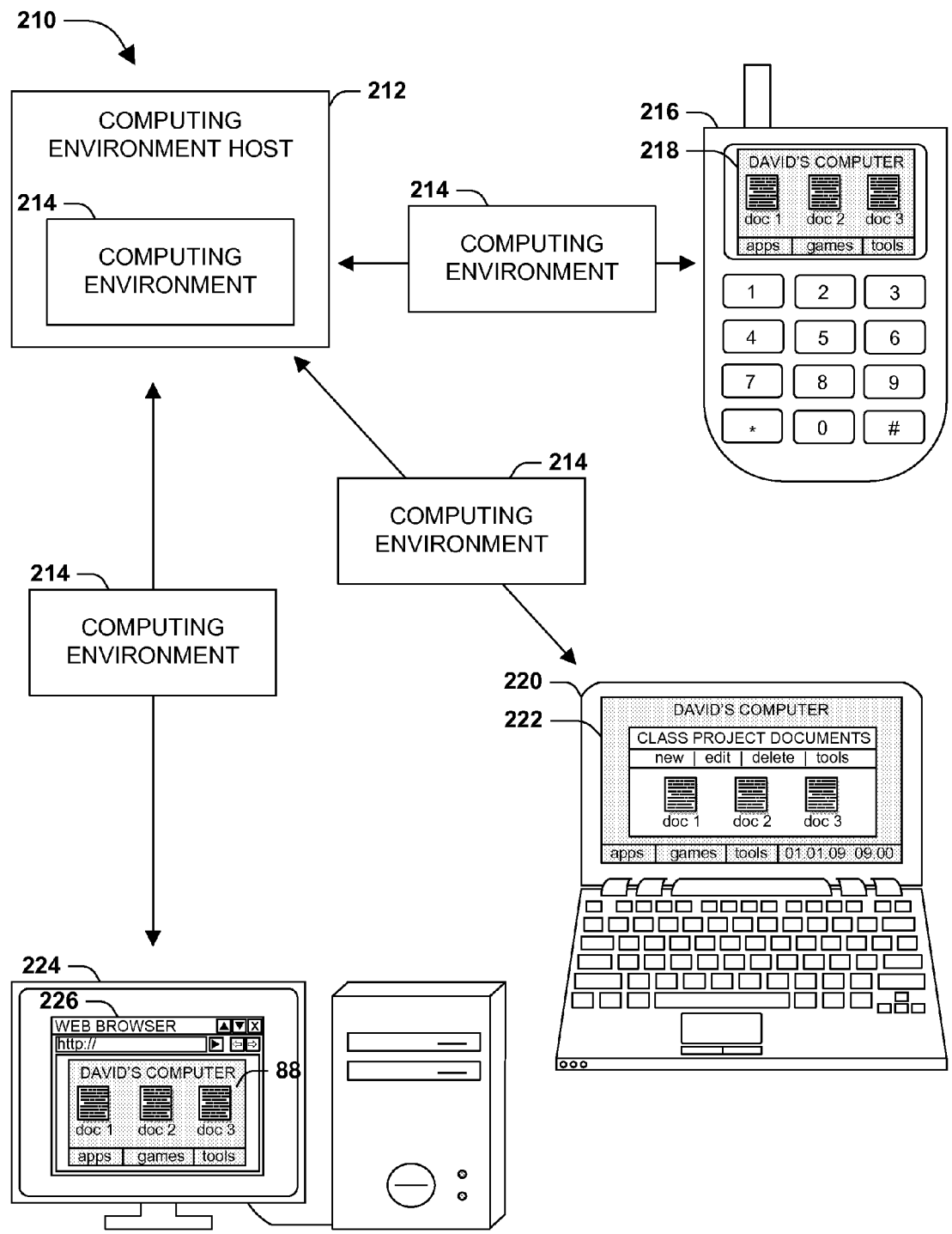
FIG. 7 is an illustration of an exemplary deployable computing environment wherein the techniques discussed herein may be implemented.

FIG. 7 illustrates one such scenario 210, wherein the computing environment may be hosted by a computing environment host 212, which may store and manage a deployable computing environment 214. The computing environment host 212 may also render the deployable computing environment 214 in different ways on behalf of various devices, such as a cellphone device 216, a personal notebook computer 220, and a public workstation 224, and also on behalf of different types of users having different access privileges. The rendering of the computing environment therefore reflects a consistent computing environment across all devices that expose the same applications, user profiles, shell configuration, user data objects, etc. Thus, a user may access a full-featured version 222 of the computing environment through a high-performance notebook computer, a stripped-down version 218 of the computing environment on a low-power cell phone device 216, and a browser-compatible and privacy-oriented version 88 of the computing environment through a web browser 226 of a public workstation 224. To the extent that the capabilities of each such device support the rendering of the computing environment, a consistent user interface and data set may be presented due to the rendering of the deployable computing environment 214 adjusted to the capabilities of each device. Updates to the computing environment may be propagated back to the computing environment host 212, and may be automatically synchronized with other devices.

The various devices illustrated in FIG. 7 may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating application user interfaces (with device-specific properties) to the same computing environment. Specifically with respect to the applications of the computing environment, the deployable computing environment 214 may include a representation of the application set, the application resources, and the data objects created thereby. Moreover, the computing environment host 212 may apply services to the various objects comprising the deployable computing environment 214, and the common format in which the data objects are stored in the deployable computing environment 214 may facilitate consistent availability and application of the services regardless of the nature of the data objects applied thereto. However, those of ordinary skill in the art may devise many types of computing environments and computing environment hosts that may be incorporated in the techniques discussed herein.

Where these techniques are utilized in regard to applications 16 that may access a computing environment (whether or not administered by a computing environment host 212), additional advantages may be achieved by configuring the techniques in view of such accesses. As a first example, the exemplary system 152 may be configured to permit users 20 to specify the permissions of an application 16 to interact with the computing environment, and to enforce such permissions by verifying the permission credentials of an application 16 before fulfilling any access request. In one such embodiment, the application 16 may comprise at least one operation applicable to the computing environment of the user 20 according to at least one permission (e.g., a permission authorized by the user 20 for the application 16 to access one or more data object, such as read-only access to a particular file in the filesystem or read/write access to a particular set of data objects or to a particular location.) The computer 22 of the user 20 may be configured to store permission tokens that respectively represent a permission to apply the operation(s) of the application 16 to the computing environment of the user 20, and the application executing component 164 may be configured to validate the permission token before applying the operation to the computing environment of the user 20. For example, a user 20 may possess a private key in an asymmetric key pair system. Upon authorizing an application 16 to perform a particular type of operation accessing the computing environment, the computer 22 of the user 20 may generate and store a permission token indicating the authorization of this permission, and may cryptographically sign this permission token with the private key of the user 20. Later, when the application executing component 164 receives a request from the application 16 to apply the operation to the computing environment, the application executing component 164 may receive the permission token from the application 16 (e.g., from the computer 22 hosting the application user interface 34 of the application 16), and may validate the permission token before applying the operation to the computing environment of the user 20. In one such embodiment, the permission token may comprise a permission cookie, which may be stored in a browser cache 60 of a web browser 50 that may be delivered to the application host 12 along with any request issued by the user 20 to the application 16 through the application user interface 34. Additionally, the application host 12 may be involved in the permission token model, e.g., by receiving from the user an authorization of the permission to apply the operation of the application 16 to the computing environment, and in response generating the permission token indicating such permissions and sending such permission tokens to the computer 20.

As a second example of this third aspect, the application host 12 may permit the user 20 to create a computing environment by selecting applications 16 to be installed, and may install the applications 16 within the computing environment for presentation within an aggregated application user interface, such as a desktop that includes separate application user interfaces for separate applications 16 that may execute concurrently on the application host 12. In this set of examples, the exemplary system 152 may include an application installing component, which may be configured to, upon receiving a request from the user 20 to install an application 16, install the application 16 within the computing environment of the user 20. Alternatively or additionally, the exemplary system 14 may include an application cataloging component, which may be configured to present to the user 20 at least one application 16 stored in the application store 14 and installable within the computing environment of the user 20 (e.g., a set of applications 16 that the application host 12 permits the user to select for installation and execution within the user's computing environment.) Alternatively or additionally, the exemplary system 152 may include an application receiving component, which may be configured to, upon receiving an application 16 from an application developer, store the application 16 in the application store 14, and to invoke the application registering component 162 to allocate the distinct subdomain of the application host 12 for the application 16. Moreover, upon receiving this application, the application receiving component 162 might also issue to the application 16 at least one application authentication credential, which might be provided by the application 16 (e.g., the application user interface 34 executing on the computer 22) in order to authenticate the application 16. Alternatively or additionally, the application host 12 might be configured to promote the authorization of the application 16 to access the computing environment. For example, if an application involves at least one operation applicable to the computing environment of the user 20 that may be performed only with the permission of the user 20, the application host 12 might identify such permissions upon installing the application 16, and may query the user 20 to authorize such permissions. In one such embodiment, the application installing component might be configured, while installing the application 16, to present to the user 20 at least one permission request query requesting an authorization of the permission of the application 16, and upon receiving the authorization from the user, to store the authorization (e.g., as a permission token stored in a browser cache of a web browser on the computer 22.) Those of ordinary skill in the art may devise many ways of configuring the application host 12 to interact with the computing environment of a user on behalf of applications 16 according to the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
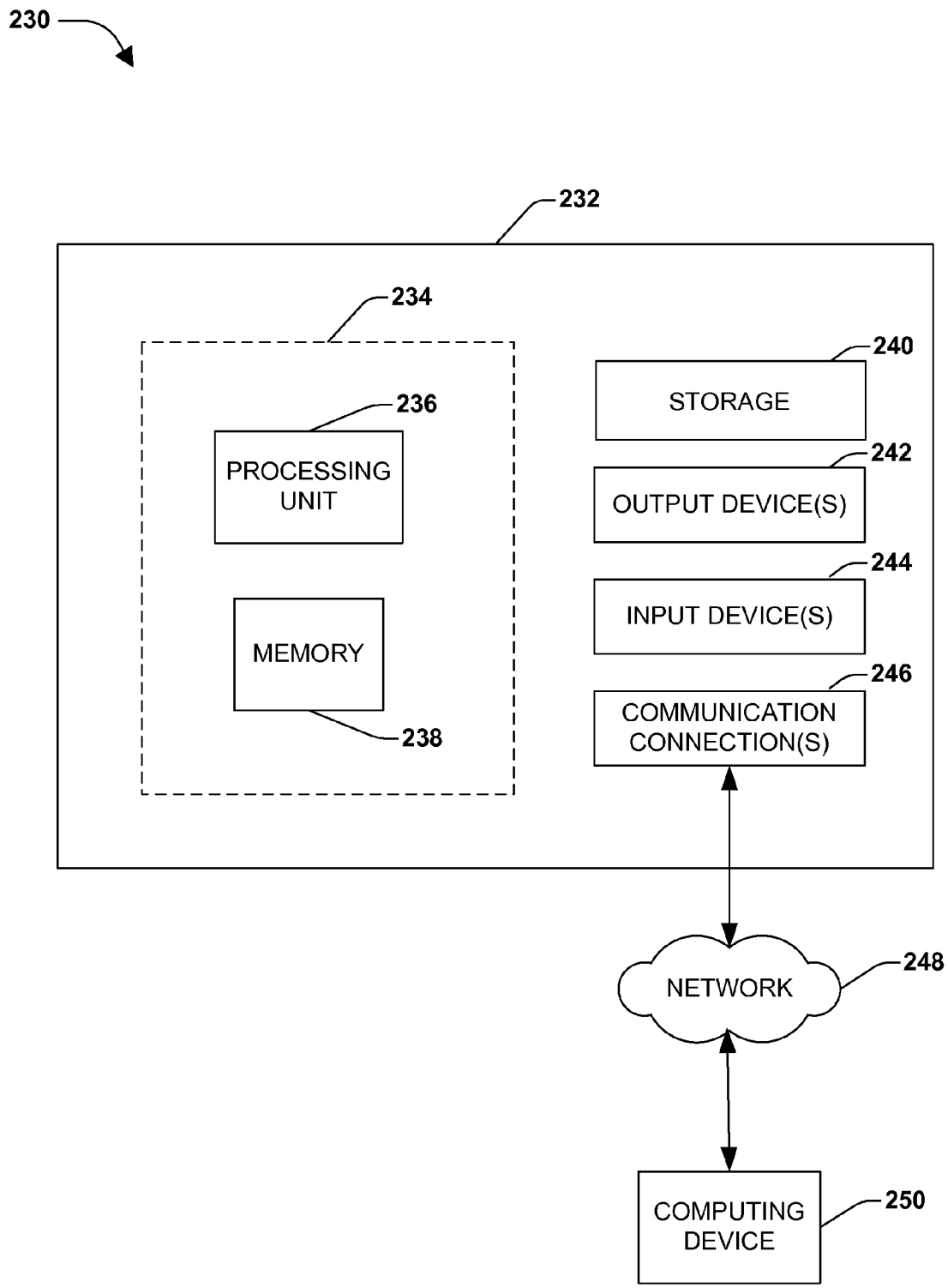
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 230 comprising a computing device 232 configured to implement one or more embodiments provided herein. In one configuration, computing device 232 includes at least one processing unit 236 and memory 238, which may be configured, e.g., to store instructions implementing the exemplary system 152 of FIG. 5. Depending on the exact configuration and type of computing device, memory 238 may be volatile (such as RAM, for example), non-volatile (such as ROM, flash memory, etc., for example) or some combination of the two. Such memory 238 might include, e.g., the application store 14 of an exemplary system 152 implementing these techniques 234

In other embodiments, device 232 may include additional features and/or functionality. For example, device 232 may also include additional storage (e.g., removable and/or non-removable) including, but not limited to, magnetic storage, optical storage, and the like. Such additional storage is illustrated in FIG. 8 by storage 22240. In one embodiment, computer readable instructions to implement one or more embodiments provided herein may be in storage 22240. Storage 22240 may also store other computer readable instructions to implement an operating system, an application program, and the like. Computer readable instructions may be loaded in memory 238 for execution by processing unit 236, for example.

The term "computer readable media" as used herein includes computer storage media. Computer storage media includes volatile and nonvolatile, removable and non-removable media implemented in any method or technology for storage of information such as computer readable instructions or other data. Memory 238 and storage 22240 are examples of computer storage media. Computer storage media includes, but is not limited to, RAM, ROM, EEPROM, flash memory or other memory technology, CDROM, Digital Versatile Disks (DVDs) or other optical storage, magnetic cassettes, magnetic tape, magnetic disk storage or other magnetic storage devices, or any other medium which can be used to store the desired information and which can be accessed by device 232. Any such computer storage media may be part of device 232.

Device 232 may also include communication connection(s) 246 that allows device 232 to communicate with other devices. Communication connection(s) 246 may include, but is not limited to, a modem, a Network Interface Card (NIC), an integrated network interface, a radio frequency transmitter/receiver, an infrared port, a USB connection, or other interfaces for connecting computing device 232 to other computing devices. Communication connection(s) 246 may include a wired connection or a wireless connection. Communication connection(s) 246 may transmit and/or receive communication media. The communication connection(s) 246 may be involved, e.g., in the network communication of the application host 12 with users 20 and computers 22 operated thereby; in the receipt of applications 16 to be made available on the application host 12; and/or in the allocation of subdomains mapped to the network address of the application host 12.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 232 may include input device(s) 244 such as keyboard, mouse, pen, voice input device, touch input device, infrared cameras, video input devices, and/or any other input device. Output device(s) 242 such as one or more displays, speakers, printers, and/or any other output device may also be included in device 232. Input device(s) 244 and output device(s) 242 may be connected to device 232 via a wired connection, wireless connection, or any combination thereof. In one embodiment, an input device or an output device from another computing device may be used as input device(s) 244 or output device(s) 242 for computing device 232.

Components of computing device 232 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 232 may be interconnected by a network. For example, memory 238 may be comprised of multiple physical memory units located in different physical locations interconnected by a network.

Those skilled in the art will realize that storage devices utilized to store computer readable instructions may be distributed across a network. For example, a computing device 250 accessible via network 248 may store computer readable instructions to implement one or more embodiments provided herein. Computing device 232 may access computing device 250 and download a part or all of the computer readable instructions for execution. Alternatively, computing device 232 may download pieces of the computer readable instructions, as needed, or some instructions may be executed at computing device 232 and some at computing device 250.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring a server having a processor and a network address to execute at least two instances of an application on behalf of a user of a device accessible over a network through a routing table, the method comprising:
executing on the processor instructions configured to:
responsive to receiving the application:
store the application; and
allocate at least two subdomains of the server for respective instances of the application, where the at least two subdomains are mapped to the network address of the server through one routing rule in the routing table; and
responsive to receiving a request to execute the application on behalf of the user:
among the at least two subdomains allocated for the respective instances of the application, select a selected subdomain that has not been selected for another instance of the application;
instantiating a new instance of the application on the processor; and
serve an application user interface of the new instance of the application to the device of the user through the selected subdomain serving the application user interface of the application.

2. The method of claim 1, wherein:
the server further comprises a web application server;
the application further comprises a web application;
the device of the user further comprises a web browser; and
the application user interface further comprises a web page embedding the application sent to the device, the web page to be rendered in the web browser.

3. The method of claim 2, wherein serving the application user interface to the user comprises: presenting to the user the application user interface within the web browser within an isolation construct configured to isolate the application user interface from other applications executing on the device.

4. The method of claim 3, wherein the isolation construct further comprises a hypertext markup language IFRAME element associated with the selected subdomain.

5. The method of claim 1, wherein:
a first instance of the application is executed on behalf of a first user, and
a second instance of the application is executed on behalf of a second user.

6. The method of claim 1, further comprising, before executing the application, authenticate the user according to at least one user authentication credential received from the user.

7. The method of claim 6, wherein the instructions are configured to:
present to the user a user login interface configured to receive from the user at least one user login credential, and
responsive to receiving from the user the at least one user login credential:
verify the at least one user login credential, and
upon verifying the at least one user login credential:
generate the at least one user authentication credential, and
send to the device of the user the at least one user authentication credential.

8. The method of claim 1, further comprising: before executing the application, authenticate the application according to at least one application authentication credential received from the application.

9. The method of claim 1, wherein the server has access to a computing environment store configured to store at least one data object comprising a computing environment of the user.

10. The method of claim 9, wherein:
the application further comprises instructions configured to perform at least one operation applicable to the computing environment of the user according to at least one permission;
the device of the user is configured to store at least one permission token representing a permission to apply the at least one operation of the application to the computing environment of the user; and
executing the application further comprises:
receiving the at least one permission token with the request to execute the application on behalf of the user;
validating the at least one permission token; and
upon validating the at least one permission token, applying the operation of the application to the computing environment of the user.

11. The method of claim 10, wherein:
the server further comprises a web application server;
the application further comprising a web application;
the at least one permission token further comprises a permission cookie; and
the device of the user having a web browser is configured to:
store the permission cookie, and
send the permission cookie to the web application server with the request to execute the application.

12. The method of claim 10, wherein the instructions are further configured to, responsive to receiving from the user an authorization of the permission to apply the at least one operation of the application to the computing environment:
generate the permission token indicating the permission to apply the at least one operation of the application to the computing environment, and
send the permission token to the device.

13. The method of claim 9, wherein the instructions are further configured to, upon receiving a request from the user to install the application, install the application within the computing environment of the user.

14. The method of claim 13, wherein the instructions are further configured to present to the user at least one application stored in an application store and installable within the computing environment of the user.

15. The method of claim 13, wherein the instructions are further configured to, responsive to receiving an application from an application developer:
    store the application in an application store, and
    allocate the selected subdomain of the server for the application.

16. The method of claim 15, wherein the instructions are further configured to, responsive to receiving the application from the application developer, issue to the application at least one application authentication credential.

17. The method of claim 13, wherein:
    the application is further configured to perform at least one operation applicable to the computing environment of the user according to at least one permission, and
    the instructions are further configured to, while installing the application on behalf of the user:
        present to the user at least one permission request query requesting an authorization of the permission of the application, and
        upon receiving the authorization from the user, store the authorization.

18. The method of claim 1, wherein the instructions are further configured to, responsive to receiving the application, create in the routing table the one routing rule that routes the at least two subdomains allocated for the respective instances of the application to the server.

19. A server that executes at least two instances of an application on behalf of a user of a device, the server comprising:
    a processor;
    a network adapter communicating with the device over a network through a routing table, wherein the server is identified to the device by a network address; and
    a memory storing instructions that, when executed by the processor, provide a system comprising:
        an application domain allocator that, responsive to receiving an application, allocates at least two subdomains of the server for respective instances of the application, where the at least two subdomains are mapped to the network address of the server through one routing rule in the routing table; and
        an application instantiator that, responsive to receiving a request to execute the application on behalf of the user:
            among the at least two subdomains allocated for instances of the application, selects a selected distinct subdomain that has not been selected for another instance of the application;
            instantiates a new instance of the application on the processor; and
            serves an application user interface of the new instance of the application to the device of the user through the selected subdomain.

20. A memory device storing instructions that, when executed by at least one processor of a server having a network address and an application store, cause the at least one processor to execute an application on behalf of a user of a device by:
    responsive to receiving the application:
        storing the application in the application store;
        allocating at least two subdomains of the server for respective instances of the application, where the at least two subdomains are mapped to the network address of the system through one routing rule in the routing table; and
    responsive to receiving a request to execute the application on behalf of the user:
        among the at least two subdomains allocated for the respective instances of the application, select a selected subdomain that has not been selected for another instance of the application;
        instantiating a new instance of the application on the device; and
        serving an application user interface of the new instance of the application to the device of the user through the selected subdomain.

\* \* \* \* \*